United States Patent [19]

Dunkle et al.

[11] Patent Number: 4,659,767

[45] Date of Patent: Apr. 21, 1987

[54] IMPACT MODIFIED POLYESTER BLENDS

[75] Inventors: Steven R. Dunkle, Flanders; Charles D. Mason, Chatham, both of N.J.

[73] Assignee: Allied Corporation, Morris Township, Morris County, N.J.

[21] Appl. No.: 690,290

[22] Filed: Jan. 10, 1985

[51] Int. Cl.[4] ............................................. C08L 67/02
[52] U.S. Cl. ...................................... 524/504; 525/64
[58] Field of Search .......................... 525/64; 524/504

[56] References Cited

U.S. PATENT DOCUMENTS

| | | | |
|---|---|---|---|
| 3,435,093 | 3/1969 | Cope | 525/176 |
| 3,639,527 | 2/1972 | Brinkmann | 525/64 |
| 4,022,748 | 5/1977 | Schlichting | 525/64 |
| 4,034,013 | 7/1977 | Lane | 525/64 |
| 4,096,202 | 6/1978 | Farnham | 525/64 |
| 4,440,905 | 4/1984 | Dunkelberger | 525/66 |
| 4,482,672 | 11/1984 | Neuray | 525/67 |
| 4,564,653 | 1/1986 | Kamata | 525/67 |

*Primary Examiner*—John C. Bleutge
*Assistant Examiner*—Patricia Short
*Attorney, Agent, or Firm*—Richard A. Negin

[57] ABSTRACT

Impact modified polyester blends are provided which are blends of a saturated polyester such as poly(ethylene terephthalate) and an impact modifying amount of a combination of a core-shell polymer and a copolymer of an alpha-olefin having 2 to 8 carbon atoms and a monomer selected from an unsaturated carboxylic acid having 3 to 8 carbon atoms and salts and anhydrides thereof.

20 Claims, No Drawings

IMPACT MODIFIED POLYESTER BLENDS

BACKGROUND OF THE INVENTION

1. Field of the Invention

This invention relates to linear, saturated polyester blends having improved impact properties. The blends contain an impact modifying amount of a combination of an acrylate-containing core-shell polymer and a copolymer of an alpha-olefin having 2 to 8 carbon atoms and a monomer selected from an unsaturated carboxylic acid having 3 to 8 carbon atoms and its derivatives including salts, anhydrides and the like. Also included are graft polymers.

2. Description of the Prior Art

It is known in the art that linear, saturated polyesters such as linear, saturated polyesters of aromatic dicarboxylic acids can be improved with respect to impact properties. It is known, for example, that the impact property of such polyesters can be improved by blending with the polyester an amount of certain core-shell polymers. Such core-shell polymers are in the form of small particles in which the core has an elastomeric character and the shell is of a substantially rigid thermoplastic character. Also, blends of such polyesters are known in which the impact has been improved by blending therewith an amount of carboxylic acid-containing copolymers of alpha-olefins having 2 to 8 carbon atoms and a monomer selected from an unsaturated carboxylic acid having 3 to 8 carbon atoms and its derivatives, such as ethylene-acrylic acid or ethylene-methacrylic acid copolymers. It is known in the art, additionally, that impact strength of polyesters can be improved to some degree by the incorporation of certain elastomers such as polybutadiene, butadiene-styrene rubbery copolymers, butadiene-acrylonitrile rubbery copolymers, ethylene-propylene rubbery copolymers, polyisobutene and polyisoprene.

It is desired that by the improvement of impact values of the polyester blends there will be a relatively small loss, if any, of other desired properties of polyester blends. For example, it is desired that the melt viscosity of the polyester not be greatly increased by the incorporation of impact modifiers in amounts necessary to significantly enhance the impact values.

SUMMARY OF THE INVENTION

This invention is a linear, saturated polyester blend having improved impact properties, which comprises about 50 to about 99 percent by weight of a linear, saturated polyester, such as linear, saturated polyesters formed from aromatic dicarboxylic acids, for example, poly(ethylene terephthalate), and 11 to about 50 percent based on the weight of the polyester blend of an impact modifying amount of a combination of acrylate-containing core-shell polymer and a copolymer of an alpha-olefin having 2 to 8 carbon atoms and a monomer selected from an unsaturated carboxylic acid having 3 to 8 carbon atoms and its derivatives including salts, anhydrides, and the like, also included are graft copolymers made of those monomers. Illustrative copolymers are ethylene copolymers selected from the group consisting of ethylene-acrylic acid copolymers, ethylene-methacrylic acid copolymers, effective metallic salts of said copolymers, and combinations thereof. In the impact modifying combination portion of the blend which does not exceed 50 percent based on the total polymer weight of the polyester blend, the amount of the core-shell polymer can vary within the range of about 10 to about 49 percent and the amount of the alpha-olefin copolymer can vary from about 1 to about 40 percent of the alpha-olefin copolymer; preferably about 20 to about 48 percent of the core-shell polymer and about 2 to about 30 percent of the alpha-olefin copolymer; and most preferably about 20 to about 46 of the core-shell polymer and about 4 to about 8 percent of the alpha-olefin copolymer; all percentages are based on the total polymer weight of the polyester blend. The impact improvement resulting from the use of the combination selected shall be substantially more than the improvement provided by the substitution in the composition of an equal weight of either component of the combination.

The core of the core-shell polymer particles is elastomeric and comprises about 25 to about 95 percent by weight based on the weight of the core-shell polymer and is made by polymerization of a monomer mixture of about 75 to about 99.8 percent based on the weight of the core-shell polymer of a ($C_1$ to $C_6$) alkyl acrylate, about 0.1 to about 5 percent by weight of a cross-linking monomer, and about 0.1 to about 5 percent by weight of a graftlinking monomer. The shell of the core-shell polymer particles consists of about 5 to about 75 percent based on the total weight of the core-shell polymer particles. The polymer of the shell portion of the core-shell polymer particles is a rigid thermoplastic polymer, said polymer preferably is made by polymerization of a monomer mixture which contains ($C_1$ to $C_6$) alkyl methacrylates and is free of materials which result in interfering functional groups on the surface of the final thermoplastic shell.

The alpha-olefin copolymers used in making the blends of this invention have at least 70 mol percent of alpha-olefin polymeric units which result from copolymerization of a monomer selected from an unsaturated carboxylic acid having 3 to 8 carbon atoms and its derivatives including salts, anhydrides, and the like. Carboxylic acid-containing comonomers suitable for preparing the ethylene/carboxylic acid copolymer include those monomers selected from the group consisting of unsaturated monocarboxylic acids of 3 to 6 carbon atoms, and mixtures thereof. Representative examples of such monomers include acrylic acid, methacrylic acid, crotonic acid, maleic acid, and fumaric acid. Preferred are acrylic acid and methacrylic acid, more preferred is acrylic acid.

DETAILED DESCRIPTION OF THE INVENTION AND THE PREFERRED EMBODIMENTS

This invention is a linear, saturated polyester blend having improved impact properties, which comprises about 50 to about 99 percent by weight of a linear, saturated polyester, such as linear, saturated polyesters formed from aromatic dicarboxylic acids, for example, poly(ethylene terephthalate), and 11 to about 50 percent based on the weight of the polyester blend of an impact modifying amount of a combination of acrylate-containing core-shell polymer and a copolymer of an alpha-olefin having 2 to 8 carbon atoms and a monomer selected from an unsaturated carboxylic acid having 3 to 8 carbon atoms and its derivatives including salts, anhydrides, and the like, also included are graft copolymers made of these monomers. Illustrative copolymers are selected from the group consisting of ethylene-acrylic acid copolymers, ethylene-methacrylic acid copolymers, effective metallic salts of said copolymers, and combinations thereof. In the impact modifying combination portion of the blend which does not exceed 50 percent based on the total polymer weight of the total polymer weight of the polyester blend, the amount of the core-shell polymer can vary within the range of about 10 to about 49 percent and the amount of the alpha olefin copolymer can vary from about 1 to about 40 percent; preferably about 20 to about 48 percent of the core-shell polymer and about 2 to about 30 percent of the alpha olefin copolymer; and most preferably about 20 to about 46 of the core-shell polymer and about 4 to about 8 percent of the alpha-olefin copolymer; all percentages are based on the total polymer weight of the polyester blend. The impact improvement resulting from the use of the combination selected shall be substantially more than the improvement provided by the substitution in the composition of an equal weight of either component of the combination.

The blends of the present invention include linear, saturated polyesters of aromatic dicarboxylic acids. The preferred linear saturated polyesters include poly(ethylene terephthalate), poly(butylene terephthalate), with poly(ethylene terephthalate) being most preferred due to the low molding temperatures attainable using it. The poly(ethylene terephthalate) for use with the present invention desirably has an intrinsic viscosity range between about 0.4 and about 1.2, preferably between about 0.4 and about 1.0, and most preferably between about 0.6 and about 0.8. Intrinsic viscosity is obtained by extrapolation of viscosity values of solutions of poly(ethylene terephthalate) to zero concentration in a 60 to 40 weight/volume ratio of phenol and tetrachloroethane. The measurements are normalized to 25° C. The poly(ethylene terephthalate) melts between about 250° C. and 275° C. The poly(ethylene terephthalate) can contain minor amounts, up to 10%, of other comonomers such as 1,4-cyclohexyldimethyldiol, butylenediol, neopentyldiol, diethylene glycol, or glutaric acid.

The core-shell polymer component usually will contain butyl acrylate units, particularly n-butyl acrylate units. The first stage or the core of the core-shell polymer particles is elastomeric in character and the shell portion is rigid thermoplastic in character. Such core-shell polymers are described in U.S. Pat. No. 4,096,202, issued to Farnham, et al. The core-shell polymer is a multi-phase composite polymer comprising about 25 to 95 weight percent of an elastomeric core and about 5 to about 75 percent by weight of a final rigid thermoplastic shell. One or more intermediate phases are optional, for example a middle stage polymerized from about 75 to 100 percent by weight styrene. The first stage core is made by polymerization of a monomer mixture of from about 75–99.8 percent by weight ($C_1$ to $C_6$) alkyl acrylate resulting in an acrylic rubber core having a Tg below about 10° C. The monomer mixture contains about 0.1 to 5 percent by weight of crosslinking monomer and further contains 0.1 to 5 percent by weight of graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, as least one of which polymerizes at a substantially different rate from at least one other of said reactive groups. The function of the graftlinking monomer is to provide a residual level of unsaturation in the elastomeric phase, particularly in the latter stages of polymerization and, consequently, at or near the surface of the elastomer particles. When the rigid thermoplastic shell is subsequently formed by polymerization on the surface of the elastomeric core, the residual unsaturated polymerizable reactive groups contributed by the graftlinking monomer participate in the subsequent reaction so that at least a portion of the rigid, thermoplastic shell is chemically attached to the surface of the elastomeric core. Among the effective graftlinking monomers are allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred core-shell polymer has only two stages, the first stage core comprises about 60 to 95 percent by weight of the core-shell polymer and made by polymerization of a monomer system comprising 95 to 99.8 percent by weight butyl acrylate, 0.1 to 2.5 percent by weight butylene diacrylate as crosslinking agent, and 0.1 to 2.5 percent by weight allyl methacrylate or diallyl maleate as a graftlinking agent; and the final rigid, thermoplastic shell is made by polymerization of a monomer mixture having from about 60 to 100 percent by weight of methyl methacrylate. The core-shell polymers used to make compositions of the present invention do not contain reactive outer polymer surfaces on the shell which interfere with the impact enhancing property of the impact modifying combination.

Although it is preferred that the core be substantially saturated, and comprises butyl acrylate, other elastomers can be used, such as a core comprising ethylene-propylene-diene rubber, and acrylic elastomer, or a polyurethane elastomer. The diene elastomers include polybutadiene, polyisoprene, polychloroprene, poly(cyanobutadiene), butadiene-styrene, and ethylene-propylene rubbery copolymers. The diene monomer used in the making of the diene elastomer may be copolymerized with up to about 50 weight percent of other monomers such as ($C_1$ to $C_6$) alkyl acrylates and methacrylates, styrene, alpha-methylstyrene, acrylonitrile and substituted acrylonitriles, vinyl ethers, vinyl amides, vinyl esters and the like. As was described above with regard to acrylic cores, the core require appropriate crosslinking and ability to react chemically with the polymers formed to make up the shell polymers.

The shell monomer system can be comprised of ($C_1$ to $C_6$) alkyl methacrylate, styrene, acrylonitrile, ($C_1$ to $C_6$) alkyl acrylates, allyl methacrylate, diallyl methacrylate, and the like, as long as the Tg is at least 20° C. Preferably the final stage monomer system is at least 50 weight percent alkyl methacrylate in which alkyl has one to four carbon atoms, for example methyl methacrylate, ethyl acrylate and the like. It is further preferred that the final stage polymer be free of units which tend to degrade poly(alkylene terephthalates), for example acid, hydroxyl, amino, and amide groups.

The crosslinked elastomer core preferably has a glass transition temperature below about −25° C. and a swelling index ranging from about 2 to 20 determined in a good "solvent" for the elastomer, i.e. a solvent which has a solubility parameter close to the solubility parameter of the polymer and is similar in polarity and hydrogen bonding ability. Thus, for polybutadienes, suitable solvents for determination of swelling index include benzene, toluene and tetrahydrofuran and for acrylic elastomers, suitable solvents include acetone, benzene and toluene.

The elastomeric core is prepared in bulk, in emulsion or in solution. Those prepared in bulk or solution are converted into aqueous emulsion by known techniques prior to the addition polymerization of the rigid polymer shell thereto.

The core-shell polymers can be prepared by emulsion polymerization of the shell comonomers in the presence of an emulsion of the elastomer core by known techniques which favor the formation of rigid thermoplastic polymer shell around the elastomer core rather than discrete particles of rigid polymer separate from the core.

The elastomeric core emulsion preferably has a weight average particle diameter of 0.3 micron or more and the thickness of the rigid polymer shell calculated from the weight added to the above elastomer, is preferably at least about 0.025 micron to prevent sintering of the core-shell particles upon coagulation and drying, and to facilitate formation of a uniform dispersion of the core-shell polymer in the polyamide. More preferably, the particle diameter is in the range of abot 0.3 to about 0.8 micron and even more preferably it is in the range of about 0.4 to about 0.7 micron so that the proportion of rigid polymer shell necessary to prevent agglomeration and sintering of the emulsion particles during the coagulation and drying step is minimized.

When the elastomer core comprises a butadiene polymer or an acrylic polymer prepared by emulsion polymerization, the particle size is generally in the range of about 0.1 to about 0.2 micron. Seeding techniques can provide emulsions of larger particle size. However, since emulsion polymerization conditions which favor the formation of large particle size, may cause a significant degree of coagulation of the elastomer core causing kettle fouling and detracting from the formation of fine, uniform dispersions of the multiphase core-shell polymer in the polyamide, it is generally preferred to form butadiene and acrylic elastomer core emulsions of large particle size in the range of about 0.3 to about 0.8 micron by controlled agglomeration of emulsions of 0.1 to 0.2 micron particle size. Agglomeration may be achieved by any conventional means such as by the addition of a suitable amount of water soluble, carboxylic acid or anhydride of such acid. The agglomerated emulsion is then stabilized by addition of a suitable emulsifier.

Polymerization to make the rigid polymer shell is carried out under conditions which favor polymerization at or onto the surface of elastomer core emulsion so that no substantial number of new "seeds" or particles form in the emulsion. This is generally accomplished by controlling the rate of addition of monomer, emulsifier and initiator. Preferably no further emulsifier is added after formation of the core elastomer emulsion. When polymerization is substantially complete, the multiphase core-shell polymer is coagulated by any convenient method such as by freezing, by addition of a coagulating solvent such as methanol optionally containing a small amount of strong acid such as hydrochloric acid, or by addition of any aqueous solution of a polyvalent metal salt such as magnesium sulfate or aluminum sulfate. The coagulated emulsion is washed with water and dried.

It has been found that the butyl acrylate containing core-shell polymer products sold under the designation KM-330 by Rohm & Haas Company is suitable for carrying out this invention.

The alpha-olefin copolymers used in making the blends of this invention are made by conventional polymerization procedures and are available commercially. The polymeric units resulting from copolymerization of monomers selected from an unsaturated carboxylic acid having 3 to 8 carbon atoms and it derivatives including salts, anhydrides, and the like. The carboxylic acid polymeric units are randomly distributed along the copolymer chains, including branch chains. The alpha-olefin units are present in the copolymer used in making the blends to at least 70 mol percent. It is desirable that the copolymers comprise 80–97 percent by weight of alpha-olefin units and about 3 to about 20 percent by weight of polymeric units resulting from the copolymerization of a monomer selected from an unsaturated carboxylic acid having 3 to 8 carbon atoms and its derivatives including salts, anhydrides, and the line. Also included are graft copolymers.

Carboxylic acid-containing comonomers suitable for preparing the alpha-olefin-acid copolymer include those monomers selected from the group consisting of unsaturated monocarboxylic acids of 3 to 6 carbon atoms, unsaturated dicarboxylic acids of 4 to 8 carbon atoms, and mixtures thereof. Representative examples of such monomers include acrylic acid, methacrylic acid, crotonic acid, maleic acid and methacrylic acid, more preferred is acrylic acid.

Useful ionic copolymers can be random ionic copolymers of an alpha-olefin of the forumla $RCH=CH_2$ where R is H or alkyl radicals having from 1 to 8 carbon atoms, and an alpha,beta-ethylenically unsaturated carboxylic acid having from 3 to 8 carbon atoms. The ionic copolymers have at least 10 percent of the carboxylic acid groups neutralized with metal ions. Random ionic copolymers which can be used in the composition of the present invention are described in U.S. Pat. No. 3,264,272, which is incorporated herein by reference.

The cations of metals which are suitable in forming the ionic copolymers which can be used in the present invention can include mono-, di- and trivalent ions of metals of Groups I, II, III, IV-A and VIII of the Periodic Table of Elements, Groups II and IV being preferred. Suitable monovalent cations include cations of sodium, potassium, lithium, cesium, silver, mercury, and copper. Suitable divalent cations include the cations of beryllium, magnesium, calcium, strontium, barium, copper, cadmium, mercury, tin, lead, iron, cobalt, nickel, and zinc. Suitable trivalent cations include the cations of aluminum, scandium, and iron. For the purposes of the composition of the present invention, the preferred metal cation used to form the ionic copolymer is the cation of zinc, magnesium, calcium and lead, most preferably being zinc.

The degree of neutralization of the ionic copolymer by the cations should be at least 10 percent of the carboxylic acid groups. It is generally desirable to neutralize at least 50 percent of the acid groups. Neutalization of about 30 to 70 percent or about 40 to about 60 percent of the acid groups are a preferred range. The degree of neutralization may be measured by several techniques known in the art, such as infrared analysis or titration. These techniques are disclosed at pages 74-75 in "Ionic Copolymers" by L. Holliday, published by John Wiley and Sons, New York and Toronto (1975).

The copolymers which can be used to form the ionic copolymers of the present invention include copolymers of ethylene and an alpha,beta-ethylenically unsaturated carboxylic acids which can be be polymerized with the ethylene include acrylic acid, methacrylic acid, itaconic acid, and ethacrylic acid. Further, the copolymers can be copolymers of the type described and used in U.S. Pat. No. 4,174,357, which is incorporated by reference.

Certain other monomers can be introduced into the polymerization mixture, so long as such additional monomer does not interfere with the properties of the blends of this invention.

Some of the carboxylic acid groups can be in ester form, such as the methyl or ethyl ester, so long as there is not interference with the desired properties of the blends of this invention.

Additional additives for polyesters used in this invention can be incorporated into the blends of this invention, for example, fillers, pigments, polyepoxides, antioxidants, plasticizers, pigments, nucleating agents, fire retardants, ultraviolet light stabilizers, other stabilizers, mold release agents, etc.

The components of the blends can be mixed in order to form the final uniform blend by such standard techniques as melt extrusion or batch mixing. Certain aids can be added in order to improve the uniformity and the facility of making such uniform blends.

The final blends of this invention can be made as by dry mixing the polyester with the polymer components of the impact modifying combination. Conventional mixing by tumbling is suitable. The polyester mixture can be formed into the desired uniform blend as by melt extrusion or other conventional means. The extruded strand of the desired impact saturated polyester composition is chopped into pellets, the pellets are tumbled for assurance of uniformity and are dried to remove unwanted mixture.

Glass fibers are a preferred filler. Other known fillers can be used as desired. The filler content can be up to about 150 percent, and preferably about 50 to about 120 percent, by weight of the polyester.

The polyester compositions of this invention are useful to mold into useful objects. A preferred molding method is injection molding. The polyester composition is melt blended in an extruder and the melt is injected in a mold of the shape of the desired object, following conventional techniques. The molded object is removed from the mold for use.

The following examples are set forth to illustrate the nature of the invention and the manner of carrying it out. However, the invention should not be considered as being limited to the details thereof.

EXAMPLE

Melt blends are formed using poly(ethylene terephthlate) having an intrinsic viscosity of 0.68–0.75 and the polymeric components as shown in the TABLE below. The components are mixed with the designated amount of poly(ethylene terephthalate) by tumbling. The polymer mixture is melt blended using a 1-inch single screw extruder at a temperature of about 500° F.

The polyester blend formed is extruded. The extruded strand is chopped into pellets. The pellets are tumbled in assurance of uniformity and then are dried to a moisture content of less than 0.02 percent.

From the dried pellets, test specimens are molded at 550° F., the mold was at 100° F. Notched Izod impact values following ASTM Test D-256.

TABLE

| Polymer | Comp. 1 | Comp. 2 | Comp. 3 | Ex. 1 | Ex. 2 |
|---|---|---|---|---|---|
| | Weight percent | | | | |
| PET[1] | 100 | 75 | 70 | 75 | 75 |
| Core-Shell 330[2] | — | 25 | 30 | 20 | 20 |
| Ethylene-acrylic[3] acid copolymer | — | — | — | 5 | — |
| Ethylene-methacrylic[4] acid copolymer, zinc salt | — | — | — | — | 5 |
| Notched Izod Impact (ft.-lbs./in.) ASTM TEST D-256 | | | | | |
| Av. value | 0.55 | 3.1 | 3.1 | 16.6 | 23.5 |
| Individ. Values | 0.545 | 3.14 | 3.14 | 20.2 | 22.6 |
| | 0.545 | 3.14 | 3.30 | 18.9 | 22.6 |
| | 0.545 | 3.30 | 3.14 | 20.6 | 22.8 |
| | 0.545 | 2.78 | 3.30 | 19.9 | 26.4 |
| | 0.545 | 2.95 | 2.78 | 3.5 | 22.9 |

[1] Poly(ethylene terephthalate)
[2] Core-shell polymer sold by Rohm and Haas Company as Acryloid KM-330
[3] Copolymer has 6.5 percent by weight of acrylic acid units
[4] Sold as by E. I. duPont de Nemours and Company as Surlyn 1801, 8 percent by weight of zinc.

When Acryloid KM-334 polymer is used in making composition Ex. 2 instead of Acryloid KM-330, an impact value of 1.3 is obtained; both Acryloid KM-330 and 334 are made from the same monomers according to information regarding them. KM 334 has been found to have greater percent extractibles: toluene, 2.42% v. 14.87%; 90% formic acid, 5.25% vs. 10.99%; trifluoroethanol, 4.75% vs. 9.7%; methyl ethyl ketone, 2.64% vs. 7.90%. Based on these data, it appears an explanation of the lower impact value obtained might be as a result of less crosslinking in the KM-334 core-shell polymer.

What is claimed is:

1. An impact modified linear saturated polyester blend comprising: polymers consisting essentially of;
   (A) from about 50 to about 86 percent by weight based upon the total polymer weight of the blend of a linear saturated polyester; and
   (B) from about 14 to about 50 percent by weight based upon the total polymer weight of an impact modifying amount of a combination of
      (1) from about 10 to about 46 percent based upon the total polymer weight of the blend of an acrylate-containing core-shell polymer having an elastomeric core and a rigid thermoplastic shell; and
      (2) from 4 to about 8 percent by weight based upon the total polymer of a copolymer of an alpha-olefin having 2 to 8 carbon atoms and a monomer selected from an unsaturated carboxylic acid having 3 to 8 carbon atoms and salts and anhydrides thereof; the ASTM D-256 notched Izod impact value of said blend being greater than that of a blend having either the core-shell polymer or the alpha-olefin copolymer alone in the same amount as said combination.

2. The blend as recited in claim 1 wherein the linear saturated polyester is poly(ethylene terephthalate).

3. The blend as recited in claim 1 or 2 wherein the amount of the core-shell polymer is from about 15 to about 46 percent based on the total polymer weight of the blend.

4. The blend as recited in claim 2 wherein the amount of the core-shell polymer is from about 20 to about 46 percent based on the total polymer weight of said blend.

5. The blend as recited in claims 1 or 2 wherein the amount of the core-shell polymer is from about 10 to about 46 percent based on the total polymer weight of said blend and wherein the alpha-olefin copolymer is an ethylene-acrylic acid copolymer.

6. The blend as recited in claim 2 wherein the amount of the core-shell polymer is from about 10 to about 46 percent based on the total polymer weight of said blend and wherein the alpha-olefin copolymer used is an ethylene-acrylic acid copolymer having about 3 to about 20 percent by weight of acrylic acid units based on the weight of the copolymer.

7. The blend as recited in claim 2 wherein the amount of the core-shell polymer is from about 10 to about 46 percent based on the total polymer weight of said blend and wherein the alpha-olefin copolymer used is an ethylene-acrylic acid copolymer having about 5 to about 10 percent by weight of acrylic acid units based on the weight of the copolymer.

8. The blend as recited in claim 1 or 2 wherein the amount of the core-shell polymer is from about 10 to about 46 percent based on the total weight of said blend and wherein the alpha-olefin copolymer is an ethylene-methacrylic acid copolymer.

9. The blend as recited in claim 2 wherein the amount of the core-shell polymer is from about 10 to about 46 percent based on the total polymer weight of said blend and wherein the alpha-olefin copolymer used in an ethylene-methacrylic acid copolymer having about 3 to about 20 percent by weight of methacrylic acid units based on the weight of the copolymer.

10. The blend as recited in claim 2 wherein the amount of the core-shell polymer is from about 10 to about 46 percent based on the total polymer weight of said blend and wherein the ethylene copolymer used in an ethylene-methacrylic acid copolymer having about 5 to about 10 percent by weight based on the weight of the copolymer.

11. An impact modified poly(ethylene terephthalate) blend comprising: polymers consisting essentially of;
(A) from about 50 to about 89 percent by weight based upon the total polymer weight of the blend of a poly(ethylene terephthalate); and
(B) from about 11 to about 50 percent by weight, based upon the total polymer weight of said blend, of an impact modifying amount of a combination of
  (1) from about 10 to about 49 percent, based upon the total polymer weight of said blend, of an acrylate-containing core-shell polymer having an elastomeric core and a rigid thermoplastic shell; and
  (2) from about 1 to about 8 percent by weight, based upon the total polymer weight of said blend, of an ethylene-acrylic acid copolymer, or an ethylene-methacrylic acid copolymer, the acid groups of which have been neutralized from 10 to 100 percent by cations of a metal; said ethylene copolymer having at least about 70 mol percent of ethylene units; the ASTM D-256 notched Izod impact value of said blend being greater than that of a blend having either the core-shell polymer of the ethlene copolymer alone in the same amount as said combination.

12. A blend of claim 11 wherein the cations are calcium, magnesium, zinc or lead cations.

13. A blend of claim 12 wherein the alpha-olefin copolymer is an ethylene-acrylic acid copolymer.

14. A blend of claim 12 wherein the alpha-olefin copolymer is an ethylene-methacrylic acid copolymer.

15. A blend of claim 12 wherein the amount of the acrylic acid units or the methacrylic acid units are present in an amount of from about 3 to about 20 based on the weight of the copolymer.

16. An impact modifier poly(ethylene terephthalate) blend comprising: polymers consisting essentially of;
(A) from about 50 to about 89 percent by weight based upon the total polymer weight of said blend of a poly(ethylene terephthalate); and
(B) from about 11 to about 50 percent by weight, based upon the total polymer weight of said blend, of an impact modifying amount of a combination of
  (1) from about 10 to about 49 percent, based upon the total polymer weight of said blend, of an acrylate-containing core-shell polymer having an elastomeric core polymerized from a monomer mixture comprising butyl acrylate and a rigid thermoplastic shell polymerized from a monomer mixture comprising alkyl acrylate wherein alkyl is methyl or ethyl; and
  (2) from about 1 to about 8 percent by weight based upon the total polymer weight of said blend, of an ethylene-acrylic acid copolymer, or an ethylene-methacrylic acid copolymer, said copolymer is neutralized from 10 to 100 percent with calcium, magnesium, zinc or lead cations; said ethylene copolymer having at least about 70 mole percent of ethylene units; the ASTM D-256 notched Izod impact value of said blend being greater than that of a blend having either the core-shell polymer or the ethylene copolymer alone in the same amount of said combination.

17. A blend of claim 16 wherein the ethylene copolymer acid groups are neutralized from about 30 to about 70 percent and the acrylic acid unit or methacrylic acid unit content is from about 3 to about 20 percent based on the weight of said copolymer.

18. A blend of claim 17 wherein the blend is filled up to 150 percent based on the weight of the blend.

19. A blend of claim 17 wherein the filler is glass fiber filler.

20. An article molded from a blend of claim 1, 2, 5, 8, 11, 12, 17 or 18.

* * * * *